H. HOWSON.
Drawing-Charts.

No. 155,726. Patented Oct. 6, 1874.

Witnesses, John K. Rupertus.
Thomas M. Sloan.

H. Howson
by his Atty.
Howson and Son

UNITED STATES PATENT OFFICE.

HENRY HOWSON, OF PHILADELPHIA, PENNSYLVANIA.

IMPROVEMENT IN DRAWING-CHARTS.

Specification forming part of Letters Patent No. 155,726, dated October 6, 1874; application filed September 8, 1874.

*To all whom it may concern:*

Be it known that I, HENRY HOWSON, of Philadelphia, Pennsylvania, have invented an Improved Drawing-Paper, &c., for Isometrical Drawing-Chart, of which the following is a specification:

The object of my invention is to afford facilities for making free sketches or linear drawings in isometrical perspective, and for the ready instruction of draftsmen, mechanics, and others in this style of drawing—an object attained in the manner which I will now proceed to describe, reference being had to the accompanying drawing, in which—

Figure 1:
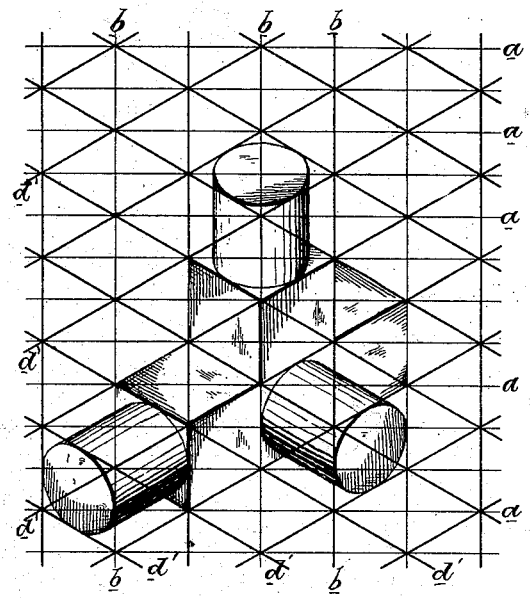

Figure 1 represents a portion of a sheet of paper or other drawing material on which are a series of lines arranged according to my invention in its simplest form.

Figure 3:
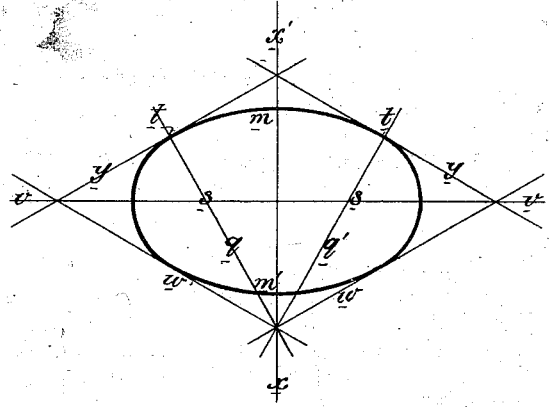
Figure 2:
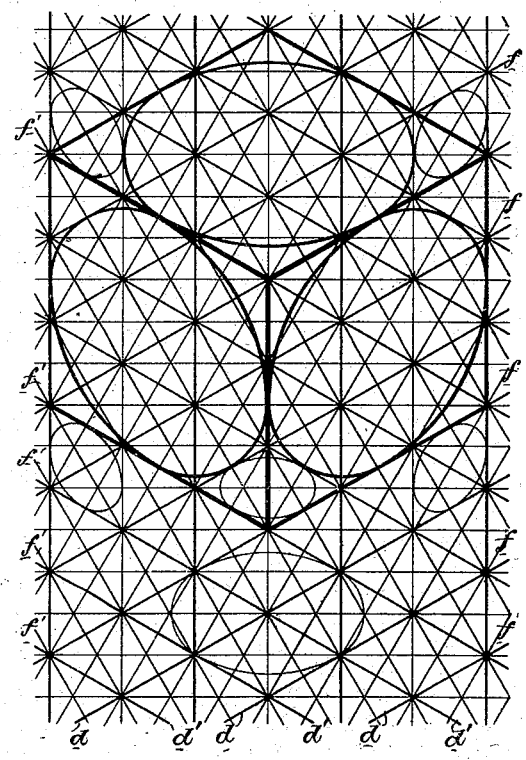

In this example there are the horizontal lines $a$ and vertical lines $b$, arranged at right angles to each other, so as to form squares—a plan heretofore adopted for facilitating the making of ordinary linear sketches, such as elevations, sections, and plan views of machinery. With these vertical and horizontal lines I combine a series of parallel isometrical lines, $d$ and $d'$, made at the usual isometrical angle of thirty degrees. It should be understood that all the lines, although made black in the drawing, for obvious reasons, should be of a light blue, red, brown, or other suitable color, and, although distinct, should not be obtrusive enough to detract from the prominence of the sketches or drawings made on the paper. The rough sketch on the lined paper, Fig. 1, will suffice to exhibit the aid which the lines above described will afford to the draftsman in making isometrical sketches of objects. Still more satisfactory results can be reached by combining with the above-mentioned horizontal, vertical, and isometrical lines two sets of diagonal lines, $f f'$, drawn to an angle of sixty degrees, for these lines indicate the proper directions of two of the three differently-arranged isometrical circles which must nearly always appear in isometrical drawings of machinery. In Fig. 2, for instance, I have drawn an isometrical representation of a cube by following the lines on the paper, and on three sides of the cube I have drawn isometrical circles. Of the circle on the left side of the cube, the direction of the long diameter is indicated by one of the lines, $f'$, and the direction of the short diameter by one of the lines $d$, while on the left of the cube there are lines to represent the directions of the two diameters of the isometrical circle there shown, the directions of the long and short diameters of the isometrical circle drawn on the top of the tube being indicated, the first by one of the horizontal lines and the second by one of the vertical lines. The system of lines not only facilitates the sketching of rectangular objects in isometrical perspective, but they afford ready means of making isometrical circles by an ordinary bow-pencil or bow-pen. In order to explain this feature, it will be advisable to refer to the diagram, Fig. 3, which shows an isometrical square of the same dimensions as one side of the cube in Fig. 2. If a line, $q$, be drawn from $x$ to a point, $t$, midway between the opposite ends of the line $y$, a point, $s$, is presented on the horizontal line $v$; and if the arc of a circle, with this point as a center and $s\ t$ as a radius, be drawn, we shall have one end of an isometrical circle, one side of which may be drawn by making the arc $m$ of a circle, with $x$ as the center and $x\ t$ as the radius, and the isometrical circle may be completed in a manner which the diagram itself will suffice to explain. It will be understood that this figure is not the true ellipse which an isometrical circle should represent, but it approximates near enough to that figure for all practical purposes. This simple mode of describing an isometrical circle is rendered unnecessary by the intersecting lines, which present ready-made centers from which the desired circles may be drawn, and this is the case with smaller circles, (shown in Fig. 2,) as with the larger circles on the cube.

Drawing in isometrical perspective has always been considered a somewhat difficult art, but it is really founded on the most simple principles, and it is believed that the lined paper described affords the best means of readily learning these principles. While this style of perspective is not well adapted to working drawings, it is by far the best for illustrations in which a thorough and rapid understanding of the object illustrated is more of an object than minute accuracy of measurement. In Patent-Office drawings, for instance, a single illustration in isometrical perspective is often more serviceable in imparting a knowledge of an invention than a number of elevations and plans. It may be remarked, moreover, that when a draftsman has become familiar, through the medium of the lined paper, with isometrical perspective, it will require but a slight mental effort to learn the principles of linear or true perspective, in which vanishing lines will take the place of the parallel isometrical lines. The use of the lined paper will, in fact, impart to the learner such familiarity with the mode of representing objects in perspective as to enable him in a short time to dispense with the paper altogether, and make both free-hand drawings and linear drawings on plain paper in perspective.

Figure 4:
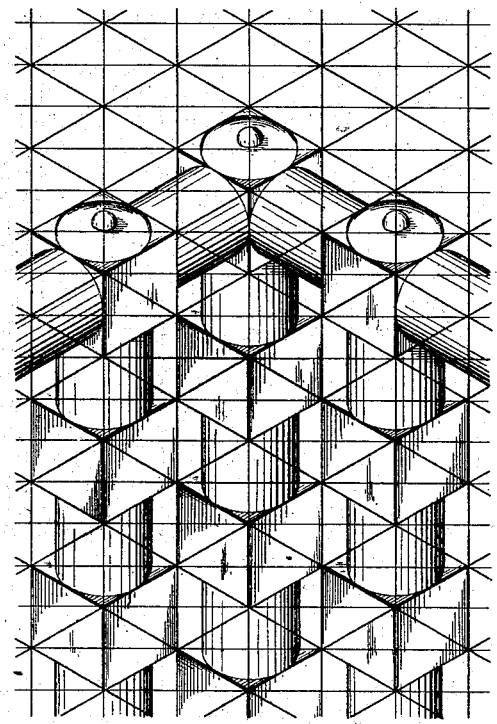

In order to render the lined paper still more serviceable, I draw on it, either in connection with cubes, as shown, or separately, or both, a number of large and small isometrical circles in their three different positions, so that they will always be present to guide the draftsman or sketcher. Fig. 4 will serve to illustrate the facilities afforded by the lines in making a comparatively intricate object in isometrical perspective.

For the use of schools, the combination of lines may be made on slates or blackboards, and tablets or drawing-boards with the lines may be used beneath tracing-paper, on which the desired isometrical sketches may be made, the lines beneath serving as guides.

I claim as my invention—

1. An isometrical drawing-chart, provided with the vertical lines $b$, horizontal lines $a$, and diagonal lines $d$ $d'$, all combined and arranged substantially as and for the purpose set forth.

2. In an isometric drawing-chart, the combination, with the lines $a$ $b$ $d$ $d'$, of the diagonal lines $f$ $f'$, as set forth.

3. In an isometric drawing-chart, the combination of the vertical, horizontal, and diagonal lines and guiding isometric circles $h$, as described.

In testimony whereof I have signed my name to this specification in the presence of two subscribing witnesses.

HENRY HOWSON.

Witnesses:
 HUBERT HOWSON,
 HARRY SMITH.